July 5, 1932.  W. H. SCHOONMAKER  1,866,270
CLUTCH MECHANISM
Filed Oct. 30, 1930   2 Sheets-Sheet 1
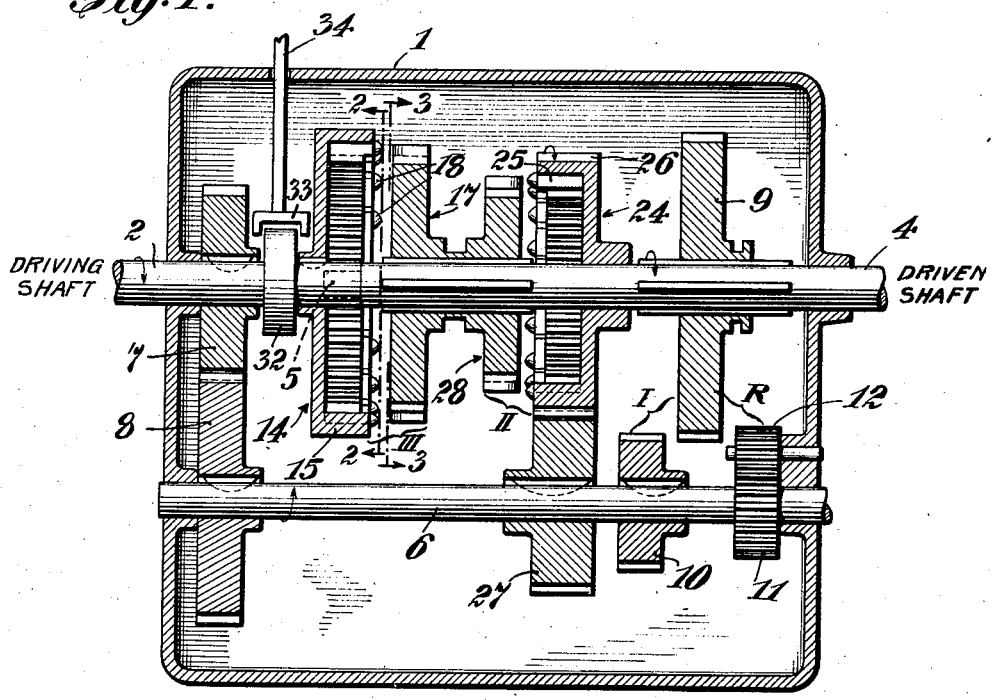
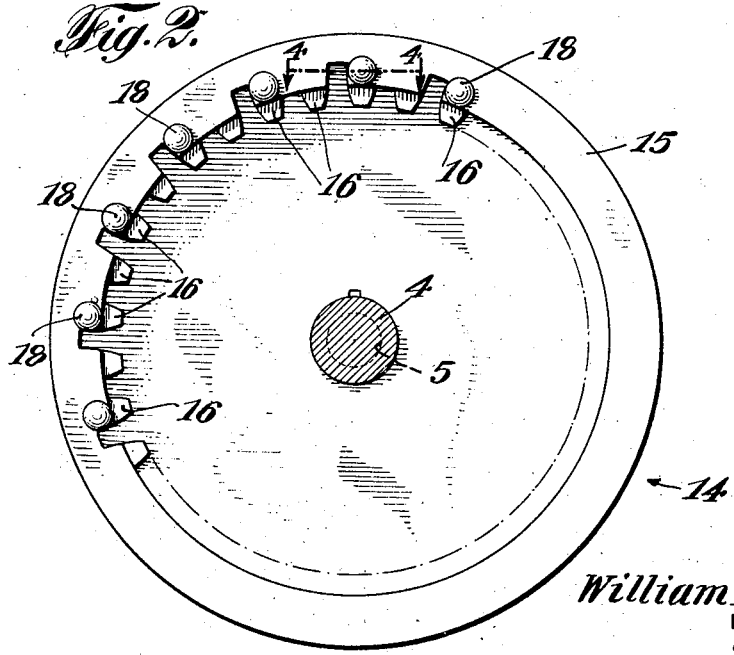
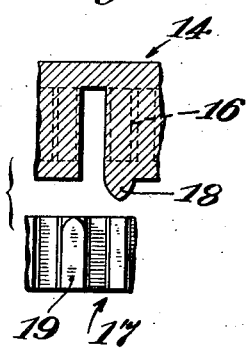
INVENTOR
William H. Schoonmaker
BY
Ramsey + Kent
his ATTORNEYS July 5, 1932.  W. H. SCHOONMAKER  1,866,270
CLUTCH MECHANISM
Filed Oct. 30, 1930  2 Sheets-Sheet 2
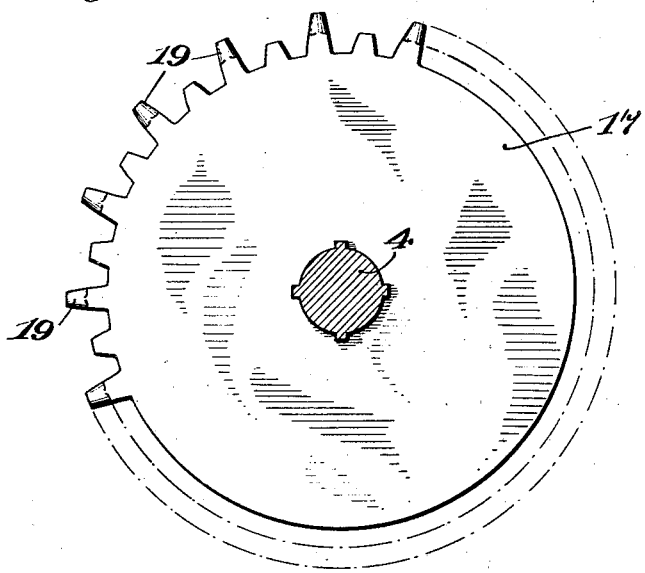
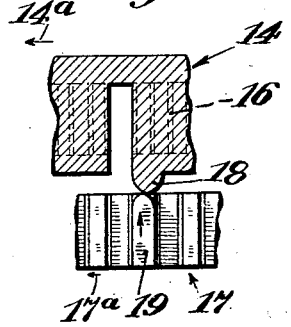
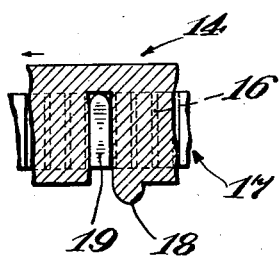
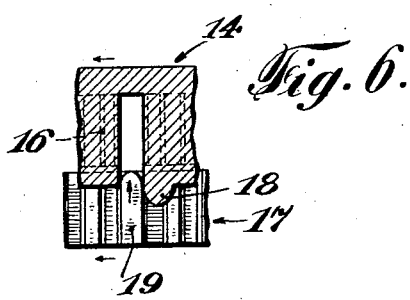
INVENTOR
*William H. Schoonmaker*
BY
*Ramsey + Kent.*
his ATTORNEYS Patented July 5, 1932

1,866,270

UNITED STATES PATENT OFFICE

WILLIAM H. SCHOONMAKER, OF MONTCLAIR, NEW JERSEY

CLUTCH MECHANISM

Application filed October 30, 1930. Serial No. 492,137.

This invention relates to clutch mechanism, i. e., to mechanism which is used to make and break a driving connection such as (for example) between a driving and a driven shaft. The invention is particularly useful in connection with a transmission for automobiles and hence it will be described in that connection. It will be obvious, however, that the transmission mechanism as a whole may be used for other purposes and that certain features of the invention may be used for various purposes.

With the conventional automobile transmission, a change in the speed ratio between the engine and the drive shaft is effected by shifting gears, i. e., by breaking a driving connection through one pair of gears and establishing a driving connection through another pair of gears, this change being made by sliding gears out of and into mesh. It is obvious that as two gears are moved into mesh there must be a certain definite speed relationship between them. As the shifting operation is commenced, the gears which are to be meshed do not normally have the speed relationship necessary for meshing and as a result it not infrequently happens that it is next to impossible to effect the desired shift. In nearly any case it is rather difficult to so handle the mechanism as to avoid the familiar "clashing" of the gears.

The general object of the present invention is to provide a clutch mechanism particularly suited for incorporation in a transmission mechanism to produce a resulting organization with which a change of speed ratio between a driving shaft and a driven shaft can be readily effected without clashing of gears.

Another object of the invention is to increase the ease with which a change of speed ratio between a driving shaft and a driven shaft may be effected.

Fig. 1 of the drawings is a longitudinal sectional view showing a transmission embodying the present invention.

Fig. 2 is a detail view of a clutch member taken on line 2—2 of Fig. 1.

Fig. 3 is a detail view of the complementary clutch member taken on line 3—3 of Fig. 1.

Fig. 4 is a fragmentary detail view taken on line 4—4 of Fig. 2 showing a pair of complementary clutch members in disengaged position.

Fig. 5 is a view similar to Fig. 4 showing the clutch members in position just prior to engagement between the clutch members.

Fig. 6 is a view similar to Fig. 4 showing the clutch members starting to engage.

Fig. 7 is a view similar to Fig. 4 showing the clutch members in engaged position.

Extending from opposite directions into a housing 1 are driving shaft 2 and driven shaft 4, the ends of the shafts being telescoped into one another, as shown at 5, so that they mutually support one another. When used as an automobile transmission, the shaft 2 will ordinarily be driven by the engine through the conventional automobile clutch and the shaft 4 will be in driving connection with the rear wheels of the car. A counter-shaft 6 is adapted to be continuously driven from shaft 2 by means of gears 7 and 8. Splined to shaft 4 and slidable thereon by any suitable means such as a conventional forked collar and lever (not shown), is a gear 9 which may be slid into mesh with a gear 10 to provide first or low speed driving connection between the shaft 2 and the shaft 4. The shaft 6 also carries a gear 11 which rotates an idler gear 12; and gear 9 may be moved into mesh with gear 12, as is well understood in the art, to provide a reverse driving connection between shaft 2 and shaft 4.

Keyed to drive shaft 2 is a clutch member 14 provided with an annular rim 15 on the interior of which are clutch teeth 16. Shaft 4 has splined thereto and slidably mounted thereon a complementary clutch member 17 which is adapted to be moved by any suitable means such as a conventional forked collar and lever (not shown), into engagement with the clutch member 14 to provide third or high speed driving connection between shaft 2 and shaft 4. It is obvious that clutch member 17 cannot be moved into engagement with clutch member 14 unless the two clutch members are either at rest or rotating in synchronism. Whenever the parts are in motion and a shift is to be made, it means making a change in the speed ratio between shaft 2 and shaft 4. It necessarily follows that upon starting to shift clutch member 17 into engagement with clutch member 14, the two clutch members are not in synchronism and must be brought to synchronism before the shift can be effected.

For the purpose of bringing the two clutch members into synchronism, clutch member 14 is provided with a series of synchronization buttons 18 and alternate clutch teeth on the clutch member 17 are provided with synchronization extensions 19 which are adapted to engage the synchronization buttons 18. Assume that clutch member 14 is rotating at a higher rate of speed than clutch member 17, as indicated by the arrows 14$^a$ and 17$^a$ in Fig. 5. As the clutch member 17 is moved toward the clutch member 14 synchronization buttons 18 will engage synchronization extensions 19 and clutch member 17 will be accelerated until the two clutch members are brought substantially to synchronism. When this condition is reached, the two clutch members can be started into engagement as shown in Fig. 6, and be moved into complete engagement as shown in Fig. 7. It will be noted that both the synchronization buttons 18 and the synchronization extensions 19 are symmetrical about planes extending radially of the clutch members, and hence there will be a similar synchronizing action whether the clutch member 17 be rotating slower or faster than clutch member 14.

Shaft 4 has freely rotatable thereon a clutch member 24 provided with an annular rim 25 on the exterior of which are gear teeth 26. Meshing with the gear teeth 26 are the teeth of a gear 27 keyed to shaft 6, so that clutch member 24 is adapted to be continuously driven from shaft 2. Second or intermediate driving connection between shaft 2 and shaft 4 is provided by shifting clutch member 28 into engagement with clutch member 24, thus locking clutch member 24 to shaft 4. The construction of clutch members 24 and 28 is similar to the construction of clutch members 14 and 17 and hence a further description of the clutch members 24 and 28 is unnecessary.

In addition to the means described for synchronizing the high speed clutch members and the second speed clutch members, braking means may be provided through a drum 32 on the shaft 2 and a brake shoe 33 operated through a rod 34 having an operating connection to the clutch pedal of the car so that when the car clutch is disengaged to break the driving connection from the engine to shaft 2, the rotation of shaft 2, shaft 6, and clutch members 14 and 24 is retarded.

It is realized that the invention may be embodied in forms other than the one particularly disclosed and hence the disclosure is to be considered as illustrative in compliance with the patent statutes and is not to be considered as limiting.

What I claim is:

1. A first rotatable clutch member comprising an annular rim, internal clutch teeth on the interior of said rim, and a series of synchronization buttons extending laterally from said rim and positioned on a circumference larger than the circumference of said internal teeth; in combination with a second rotatable clutch member comprising external clutch teeth adapted to mesh with said internal teeth, and synchronization extensions on certain of said external teeth, said extensions extending radially of the clutch members and being positioned to engage said synchronization buttons as one clutch member is moved axially toward the other.

2. A first rotatable clutch member comprising an annular rim, internal clutch teeth on the interior of said rim, and a series of synchronization buttons extending laterally from said rim and positioned on a circumference larger than the circumference of said internal teeth; in combination with a second rotatable clutch member comprising external clutch teeth adapted to mesh with said internal teeth, and synchronization extensions on certain of said external teeth, said extensions extending radially of the clutch members and being positioned to engage said synchronization buttons as one clutch member is moved axially toward the other; said buttons and said extensions being symmetrical about planes extending radially of the clutch members.

3. A first rotatable clutch member comprising an annular rim, internal teeth on the interior of said rim, and a series of synchronization buttons extending laterally from said rim and positioned on a circumference larger than the circumference of said internal teeth, said buttons having taper faces; in combination with a second rotatable clutch member comprising external clutch teeth adapted to mesh with said internal teeth, and taper faced synchronization extensions on cetrain of said external teeth, said extensions extending radially of the clutch members and being positioned for engagement between the taper faces of the extensions and the taper faces of the buttons as one clutch member is moved axially toward the other.

4. A first rotatable clutch member comprising an annular rim, internal teeth on the interior of said rim, and a series of synchronization buttons extending laterally from said rim and positioned on a circumference larger than the circumference of said internal teeth, said buttons having taper faces; in combination with a second rotatable clutch member comprising external clutch teeth adapted to mesh with said internal teeth, and taper faced synchronization extensions on certain of said external teeth, said extensions extending radially of the clutch members and being positioned for engagement between the taper faces of the extensions and the taper faces of the buttons as one clutch member is moved axially toward the other; said buttons and said extensions being symmetrical about planes extending radially of the clutch members.

WILLIAM H. SCHOONMAKER.